United States Patent
Yasuda et al.

(10) Patent No.: US 7,434,656 B2
(45) Date of Patent: Oct. 14, 2008

(54) EXHAUST DEVICE FOR VEHICLE ENGINE

(75) Inventors: Kazuhiro Yasuda, Saitama (JP);
Masashi Koyanagi, Saitama (JP);
Shintaro Abe, Saitama (JP); Kazuo Yamamoto, Saitama (JP); Tadashi Oshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 11/213,818

(22) Filed: Aug. 30, 2005

(65) Prior Publication Data

US 2006/0042871 A1   Mar. 2, 2006

(30) Foreign Application Priority Data

Aug. 31, 2004   (JP)   ............... 2004-251281

(51) Int. Cl.
*F01N 7/08*   (2006.01)

(52) U.S. Cl. ............... 181/227; 181/212; 181/243; 181/228; 181/207; 60/308; 60/316; 60/319; 60/321

(58) Field of Classification Search ............... 181/212, 181/227, 228, 243, 207; 60/308, 316, 319, 60/321, 322, 272, 320, 323, 282, 312, 313, 60/22; 180/309, 89.2, 296, 68.3; 138/110, 138/99; 123/184.21
See application file for complete search history.

(56) References Cited

U.S. PATENT DOCUMENTS

| | | | | |
|---|---|---|---|---|
| 650,290 A | * | 5/1900 | Wirt | 181/207 |
| 1,845,474 A | * | 2/1932 | Bellanca | 244/130 |
| 1,890,151 A | * | 12/1932 | Hadley | 285/324 |
| 1,893,820 A | * | 1/1933 | Dicks | 416/90 R |
| 2,099,756 A | * | 11/1937 | Seigle | 285/55 |
| 2,370,559 A | * | 2/1945 | Markey | 248/603 |
| 2,608,819 A | * | 9/1952 | Moorehead et al. | 60/322 |
| 2,775,470 A | * | 12/1956 | Bixler et al. | 277/350 |
| 2,958,389 A | * | 11/1960 | Deremer | 181/266 |
| 3,105,708 A | * | 10/1963 | Esty | 285/41 |
| 3,161,407 A | * | 12/1964 | Victor | 267/135 |

(Continued)

FOREIGN PATENT DOCUMENTS

| | | | |
|---|---|---|---|
| EP | 0 949 407 A1 | | 10/1999 |
| JP | 60093112 A | * | 5/1985 |
| JP | 06294321 A | * | 10/1994 |
| JP | 07032893 A | * | 2/1995 |
| JP | 08189351 A | | 7/1996 |
| JP | 2001-123829 A | | 5/2001 |
| JP | 2001132428 A | * | 5/2001 |
| JP | 2002-139016 A | | 5/2002 |

*Primary Examiner*—Lincoln Donovan
*Assistant Examiner*—Forrest Phillips
(74) *Attorney, Agent, or Firm*—Birch, Stewart, Kolasch & Birch, LLP

(57) ABSTRACT

An exhaust device includes an exhaust pipe connected at its upstream end to a cylinder head of the engine and an exhaust muffler connected to the downstream end of the exhaust pipe for suppressing the generation of noise from a heat insulating cover that covers a part of the exhaust pipe. A heat insulating cover covers a portion of the exhaust pipe near the engine and a stay is fixed to the heat insulating cover. The stay includes a supporting plate portion curved so as to partially surround the outer circumference of the exhaust pipe. A first vibration isolating member is provided that is sandwiched between the outer circumference of the exhaust pipe and the supporting plate portion, a band member is tightened to mount the supporting plate portion to the exhaust pipe, and a second vibration isolating member is sandwiched between the supporting plate portion and the band member.

23 Claims, 6 Drawing Sheets

U.S. PATENT DOCUMENTS

| | | | | |
|---|---|---|---|---|
| 3,237,716 | A * | 3/1966 | Parsons | 181/243 |
| 3,374,857 | A * | 3/1968 | Hutchins | 181/244 |
| 3,602,334 | A * | 8/1971 | Goodman | 181/243 |
| 4,018,049 | A * | 4/1977 | Konishi et al. | 60/282 |
| 4,031,700 | A * | 6/1977 | Yamazaki et al. | 60/322 |
| 4,085,816 | A * | 4/1978 | Amagai et al. | 180/89.2 |
| 4,410,013 | A * | 10/1983 | Sasaki et al. | 138/149 |
| 4,413,657 | A * | 11/1983 | Sasaki et al. | 138/149 |
| 4,619,292 | A * | 10/1986 | Harwood | 138/113 |
| 4,699,243 | A * | 10/1987 | Enoki | 181/207 |
| 4,744,440 | A * | 5/1988 | Hanson | 181/227 |
| 4,955,193 | A * | 9/1990 | Hoeptner, III | 60/320 |
| 5,004,018 | A * | 4/1991 | Bainbridge | 138/149 |
| 5,026,476 | A * | 6/1991 | Ishimoto et al. | 210/89 |
| 5,036,947 | A * | 8/1991 | Metzger | 181/241 |
| H001317 | H * | 6/1994 | Ng | 181/207 |
| 5,406,791 | A * | 4/1995 | Bauer | 60/322 |
| 5,474,123 | A * | 12/1995 | Buckshaw | 165/134.1 |
| 5,487,667 | A * | 1/1996 | Bolen | 439/164 |
| 5,682,741 | A * | 11/1997 | Augustin et al. | 60/323 |
| 5,832,723 | A * | 11/1998 | Iwata et al. | 60/276 |
| 5,880,413 | A * | 3/1999 | Wagner et al. | 181/211 |
| 5,966,933 | A * | 10/1999 | Ishihara et al. | 60/322 |
| 6,129,328 | A * | 10/2000 | Knurek et al. | 248/638 |
| 6,438,949 | B1 * | 8/2002 | Nozaki | 60/322 |
| 6,625,979 | B2 * | 9/2003 | Sugaya et al. | 60/323 |
| 6,647,715 | B2 * | 11/2003 | Farkas | 60/323 |
| 6,758,300 | B2 * | 7/2004 | Kromis et al. | 180/309 |
| 6,789,386 | B1 * | 9/2004 | Haerle | 60/323 |
| 6,863,154 | B2 * | 3/2005 | Uegane et al. | 181/207 |
| 7,162,868 | B2 * | 1/2007 | Funakoshi | 60/323 |
| 2002/0166719 | A1 * | 11/2002 | Dooley | 181/228 |
| 2002/0166720 | A1 * | 11/2002 | Kusabiraki et al. | 181/240 |
| 2003/0057013 | A1 * | 3/2003 | Uegane et al. | 181/207 |
| 2004/0069562 | A1 * | 4/2004 | Kondo et al. | 181/227 |
| 2004/0083714 | A1 * | 5/2004 | Tsuruta | 60/272 |
| 2004/0216453 | A1 * | 11/2004 | Oshima et al. | 60/322 |
| 2005/0139416 | A1 * | 6/2005 | Niwa et al. | 181/207 |
| 2005/0140075 | A1 * | 6/2005 | Mishima | 267/140.11 |
| 2006/0042871 | A1 * | 3/2006 | Yasuda et al. | 181/227 |
| 2006/0219860 | A1 * | 10/2006 | Greenwood | 248/560 |
| 2007/0012274 | A1 * | 1/2007 | Kawatani | 123/184.21 |

\* cited by examiner

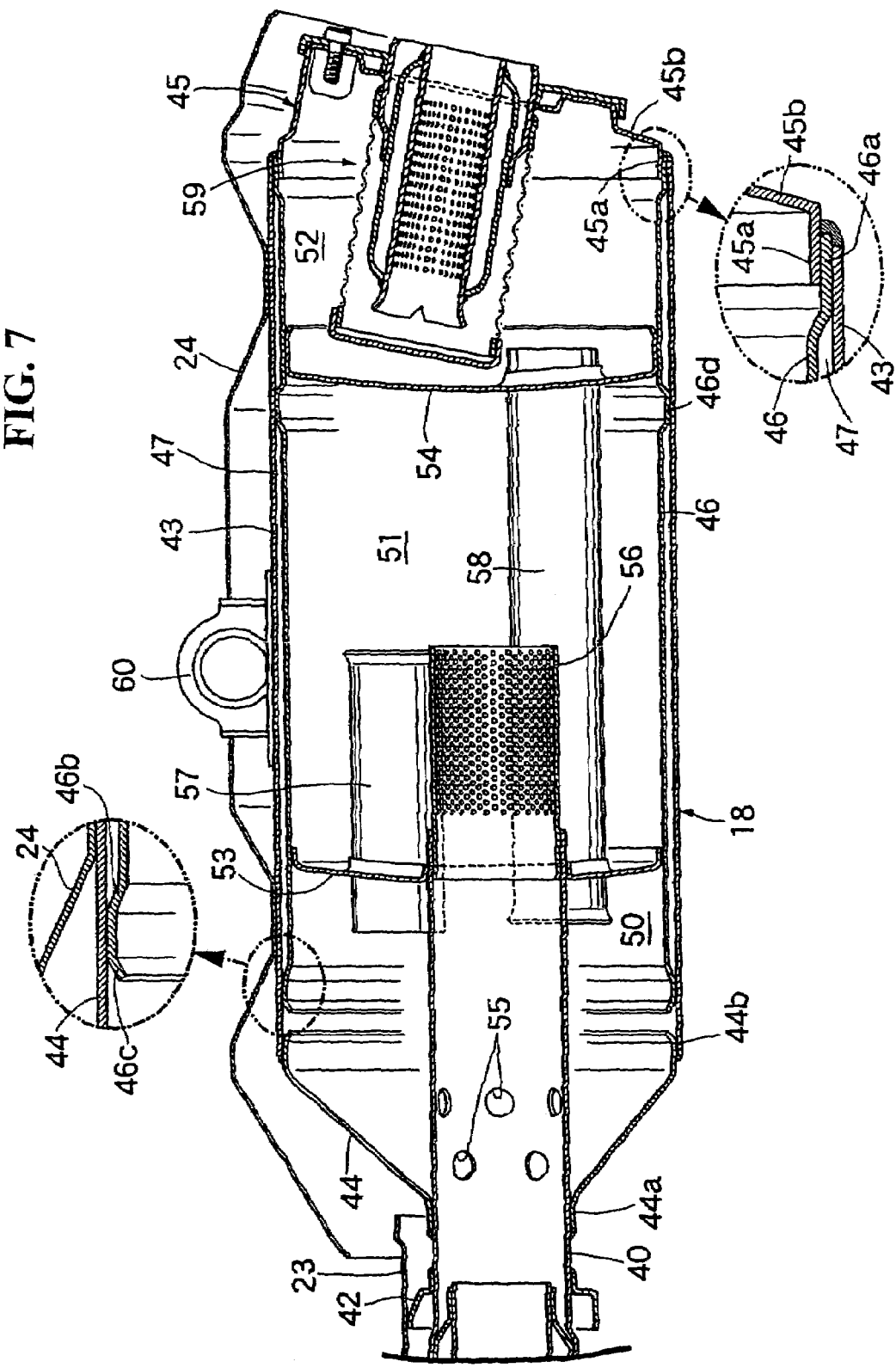

EXHAUST DEVICE FOR VEHICLE ENGINE

CROSS-REFERENCE TO RELATED APPLICATIONS

The present non-provisional application claims priority under 35 USC 119 to Japanese Patent Application No. 2004-251281 filed on Aug. 31, 2004 the entire contents thereof is hereby incorporated by reference.

BACKGROUND OF THE INVENTION

1. Field of the Invention

The present invention relates to an exhaust device for an engine adapted to be mounted on a vehicle, the exhaust device having an exhaust pipe connected at its upstream end to a cylinder head of the engine and an exhaust muffler connected to the downstream end of the exhaust pipe.

2. Description of Background Art

An exhaust device is known as disclosed in Japanese Patent Laid-open No. 2001-123829.

Such an exhaust device tends to vibrate due to the exhaust pressure. In the case when a heat insulating cover is provided for directly covering an exhaust pipe is mounted on the exhaust pipe by using a band as disclosed in Japanese Patent Laid-open No. 2001-123829, vibrations of the exhaust pipe are transmitted to the heat insulating cover. Thus, there is a possibility that noise due to the vibrations of the heat insulating cover may be increased.

SUMMARY AND OBJECTS OF THE INVENTION

It is accordingly a first embodiment of the present invention an exhaust device for a vehicle engine is provided which can suppress the generation of noise from the heat insulating cover for covering a part of the exhaust pipe.

In an exhaust muffler having a long double pipe structure composed of an inner cylinder and an outer cylinder, there is a case wherein the influence of noise must be considered because the outer cylinder performs the same operation as that of the heat insulating cover. In this case, the outer cylinder is fixed to the inner cylinder in manufacturing the conventional exhaust muffler by plug welding in the condition where a relative position between the outer cylinder and the inner cylinder is hard to confirm. It is therefore necessary to improve the accuracy of positioning between the inner cylinder and the outer cylinder by using a jig or the like in the manufacture, thereby improving a silencing function of the exhaust muffler.

It is accordingly a second embodiment of the present invention to provide an exhaust device for a vehicle engine which can easily improve the relative positional accuracy between the outer cylinder and the inner cylinder of an exhaust muffler having a double pipe structure to thereby suppress the generation of noise from the exhaust muffler.

In accordance with an embodiment of the invention, there is provided an exhaust device for an engine adapted to be mounted on a vehicle, wherein the exhaust device having an exhaust pipe is connected at its upstream end to a cylinder head of the engine and an exhaust muffler connected to the downstream end of the exhaust pipe. The exhaust device includes a heat insulating cover for covering at least a portion of the exhaust pipe near the engine. A stay is fixed to the heat insulating cover with the stay including a supporting plate portion curved so as to partially surround the outer circumference of the exhaust pipe. A first vibration isolating member is sandwiched between the outer circumference of the exhaust pipe and the supporting plate portion. A band member is adapted to be tightened to mount the supporting plate portion to the exhaust pipe with a second vibration isolating member sandwiched between the supporting plate portion and the band member.

In accordance with an embodiment of the invention, the first vibration isolating member and the second vibration isolating member are formed by bending a single vibration isolating sheet.

In accordance with an embodiment of the invention, at least a part of the exhaust pipe has a double pipe structure composed of an inner pipe and an outer pipe surrounding the inner pipe, an annular resonance chamber is defined between the inner pipe and the outer pipe with the inner pipe being formed with a resonator hole communicating with the annular resonance chamber.

In accordance with an embodiment of the invention, the inner pipe is fixed at one end thereof to the outer pipe and is slidably engaged at the other end with the outer pipe.

In accordance with an embodiment of the invention, the exhaust muffler is provided with an inlet pipe, the downstream end of the outer pipe is fixed to the inlet pipe with one end of the inner pipe near the engine being fixed to the upstream end of the outer pipe.

In accordance with an embodiment of the invention, the resonator hole is formed at one end portion of the inner pipe near the engine.

In accordance with an embodiment of the invention, there is provided an exhaust device for an engine adapted to be mounted on a vehicle with the exhaust device having an exhaust pipe connected at its upstream end to a cylinder bead of the engine and an exhaust muffler connected to the downstream end of the exhaust pipe. The exhaust muffler includes an outer cylinder, a pair of end caps for closing the opposite ends of the outer cylinder, and a continuous inner cylinder set in the outer cylinder so as to define an annular closed chamber between the inner cylinder and the outer cylinder with one end of the outer cylinder, one of the end caps, and one end of the inner cylinder being overlaid and welded together.

In accordance with an embodiment of the invention, a large-diameter portion for making contact with the inner surface of the outer cylinder at its other end portion is formed at the other end of the inner pipe.

In accordance with an embodiment of the invention, an intermediate large-diameter portion for making contact with the inner surface of the outer cylinder at its intermediate portion is formed at an intermediate portion of the inner cylinder.

In accordance with an embodiment of the invention, a tapering portion is formed at any one of the opposite ends of the inner cylinder so as to be tapered outwardly of the inner cylinder.

According to an embodiment of the invention, the first vibration isolating member is sandwiched between the exhaust pipe and the supporting plate portion of the stay fixed to the heat insulating cover for covering at least a portion of the exhaust pipe near the engine, and the second vibration isolating member is sandwiched between the supporting plate portion and the band member for mounting the supporting plate portion to the exhaust pipe. Accordingly, vibrations from at least a portion of the exhaust pipe to the heat insulating cover can be reduced wherein vibrations from the engine are easily transmitted to this portion of the exhaust pipe, so that the generation of noise due to vibrations of the heat insulating cover can be suppressed. Moreover, since the heat insulating cover is spaced from the exhaust pipe, a higher heat insulating effect can be obtained.

According to an embodiment of the invention, the first and second vibration isolating members that are respectively sandwiched between the supporting plate portion of the stay and the exhaust pipe and between the band member and the supporting plate portion can be easily managed with the separation of the first and second vibration isolating members being prevented, and the number of parts can be reduced.

According to an embodiment of the invention, a resonator having an excellent silencing effect can be configured in the exhaust pipe without an increase in size of the exhaust muffler. Furthermore, since at least a part of the exhaust pipe has a double pipe structure, the surface temperature of the exhaust pipe can be reduced to thereby increase the flexibility of layout of the exhaust device.

According to an embodiment of the invention, the inner pipe of the exhaust pipe having a double pipe structure can slide according to thermal expansion.

According to an embodiment of the invention, the inner pipe can extend toward the exhaust muffler with a sufficient space.

According to an embodiment of the invention, a higher silencing effect can be obtained by a resonator effect.

According to an embodiment of the invention, cost reduction can be expected by using the continuous inner cylinder. Further, the transmission of vibrations of the inner cylinder due to fluctuations in exhaust pressure to the outer cylinder can be blocked by the annular closed chamber defined between the outer cylinder and the inner cylinder, thereby obtaining an effect of preventing the generation of noise from the outer cylinder. Further, one end of the outer cylinder, one of the opposite end caps, and one of the inner cylinder are overlaid and welded together. Accordingly, a cost reduction can be expected by reducing the number of welding positions. Further, the relative positional accuracy between the outer cylinder and the inner cylinder can be easily increased to make the exhaust muffler exhibit a sufficient silencing function.

According to an embodiment of the invention, in configuring a structure for defining the annular closed chamber between the inner cylinder and the outer cylinder, an increase in the number of parts can be avoided and a dimensional accuracy can be improved. Moreover, a difference in the thermal expansion between the outer cylinder and the inner cylinder can be absorbed by the sliding of the other end of the inner cylinder.

According to an embodiment of the invention, the intermediate portion of the inner cylinder can also be supported on the outer cylinder with a reduced number of parts and an improved dimensional accuracy, so that the mounting stiffness of the inner cylinder can be improved.

According to an embodiment of the invention, insertion of the inner cylinder into the outer cylinder can be facilitated to thereby improve the assemble of the unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a longitudinal sectional view of an exhaust muffler.

DETAILED DESCRIPTION OF THE PREFERRED EMBODIMENTS

A preferred embodiment of the present invention will now be described with reference to the attached drawings.

Figure 1:
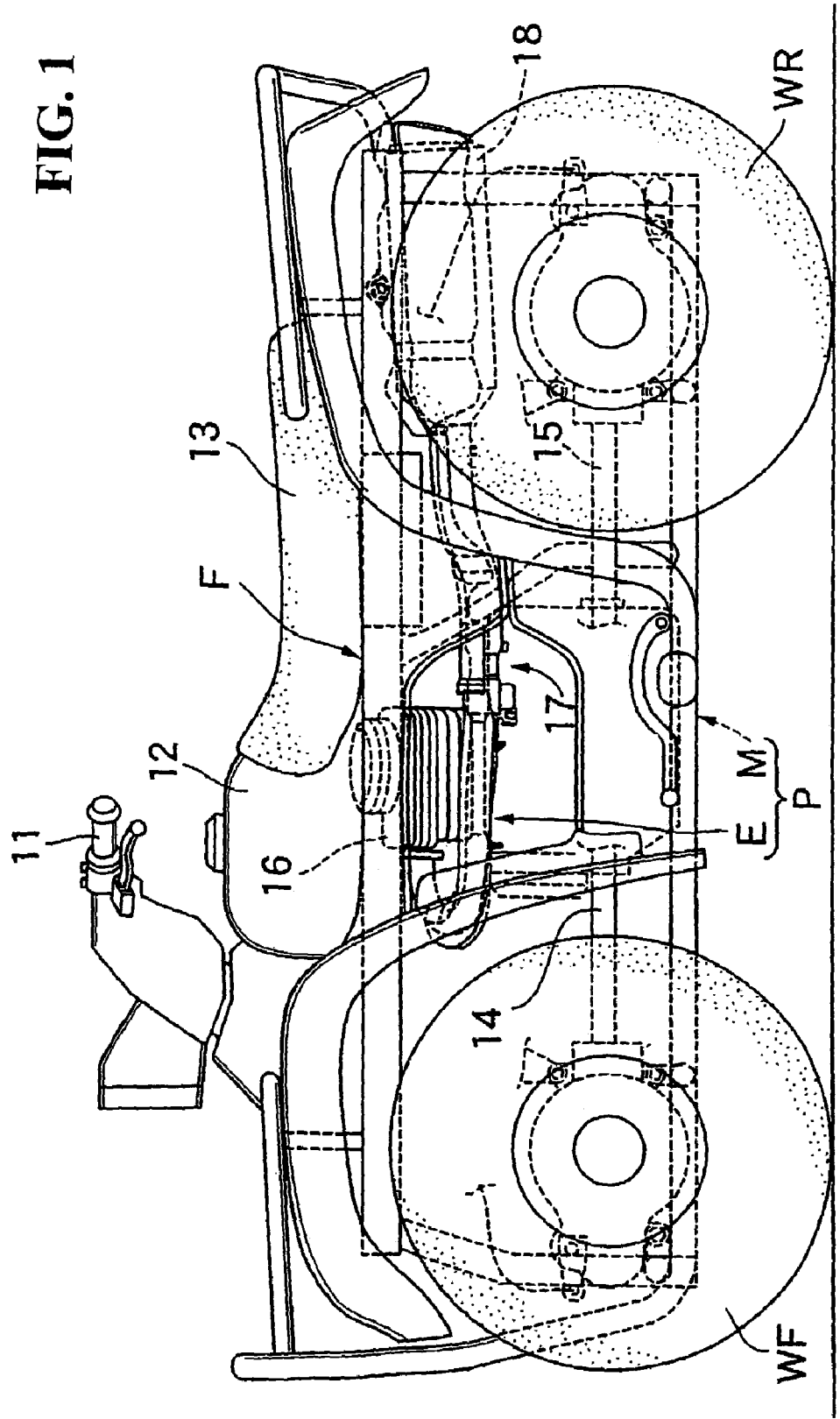
FIG. 1 is a side view of a saddle seat type vehicle.

Referring first to FIG. 1, this saddle seat type vehicle is a four-wheeled buggy for operating on rough terrain, which has a body frame F. A pair of right and left front wheels WF are supported to a front portion of the body frame F, and a pair of right and left rear wheels WR are supported to a rear portion of the body frame F. A steering handle 11, a fuel tank 12, and a saddle type driver's seat 13 are provided on an upper portion of the body frame F so as to be arranged in this order from the front side of the vehicle.

A power unit P is mounted on the body frame F at its intermediate portion below the fuel tank 12 and the driver's seat 13. The power unit P includes an engine E and a transmission M having a common casing. A drive shaft 14 extends forwardly from the power unit P to transmit power from the power unit P to the right and left front wheels WF, and a drive shaft 15 extends rearwardly from the power unit P to transmit power from the power unit P to the right and left rear wheels WR.

Figure 2:
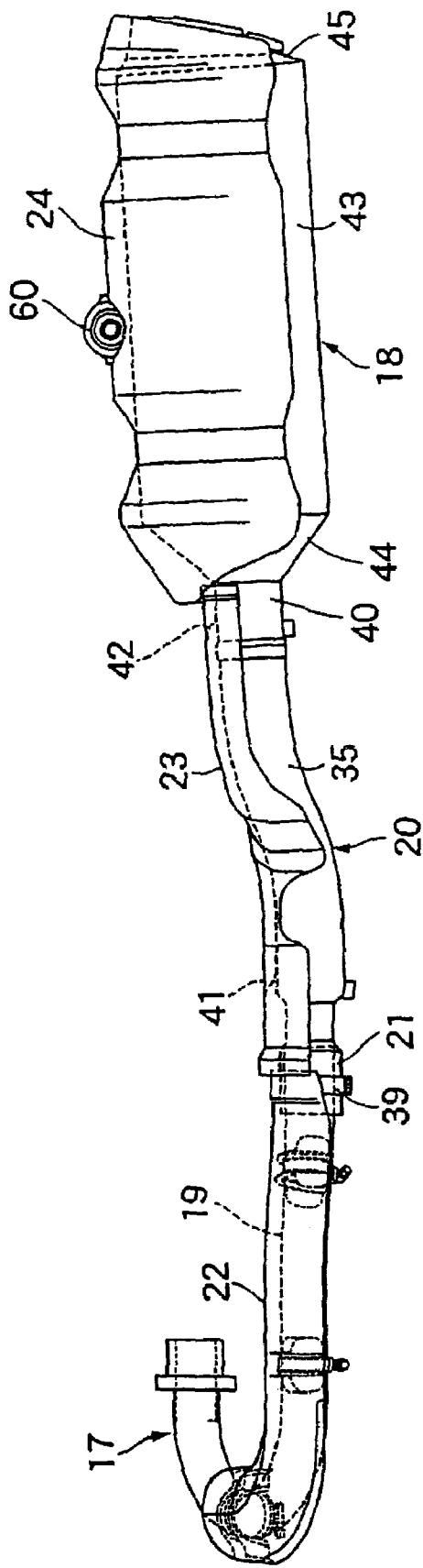
FIG. 2 is an enlarged side view of an exhaust device.

Referring also to FIG. 2, an exhaust pipe 17 is connected at its upstream end to the front surface of a cylinder head 16 of the engine E, and an exhaust muffler 18 is connected to the downstream end of the exhaust pipe 17.

The exhaust pipe 17 is generally composed of a front exhaust pipe 19 and a rear exhaust pipe 20 connected through a connection pipe 21 to the front exhaust pipe 19. The front exhaust pipe 19 is a substantially a U-shaped pipe connected at its upstream end to the front surface of the cylinder head 16 and curved so as to extend from the front surface of the cylinder head 16 along the left side surface of the cylinder head 16. The rear exhaust pipe 20 is connected at its upstream end through the connection pipe 21 to the downstream end of the front exhaust pipe 19, and extends rearwardly therefrom. The exhaust muffler 18 is connected at its upstream end to the downstream end of the rear exhaust pipe 20. The front exhaust pipe 19, the rear exhaust pipe 20, and the exhaust muffler 18 are covered with heat insulating covers 22, 23, and 24, respectively.

Figure 3:
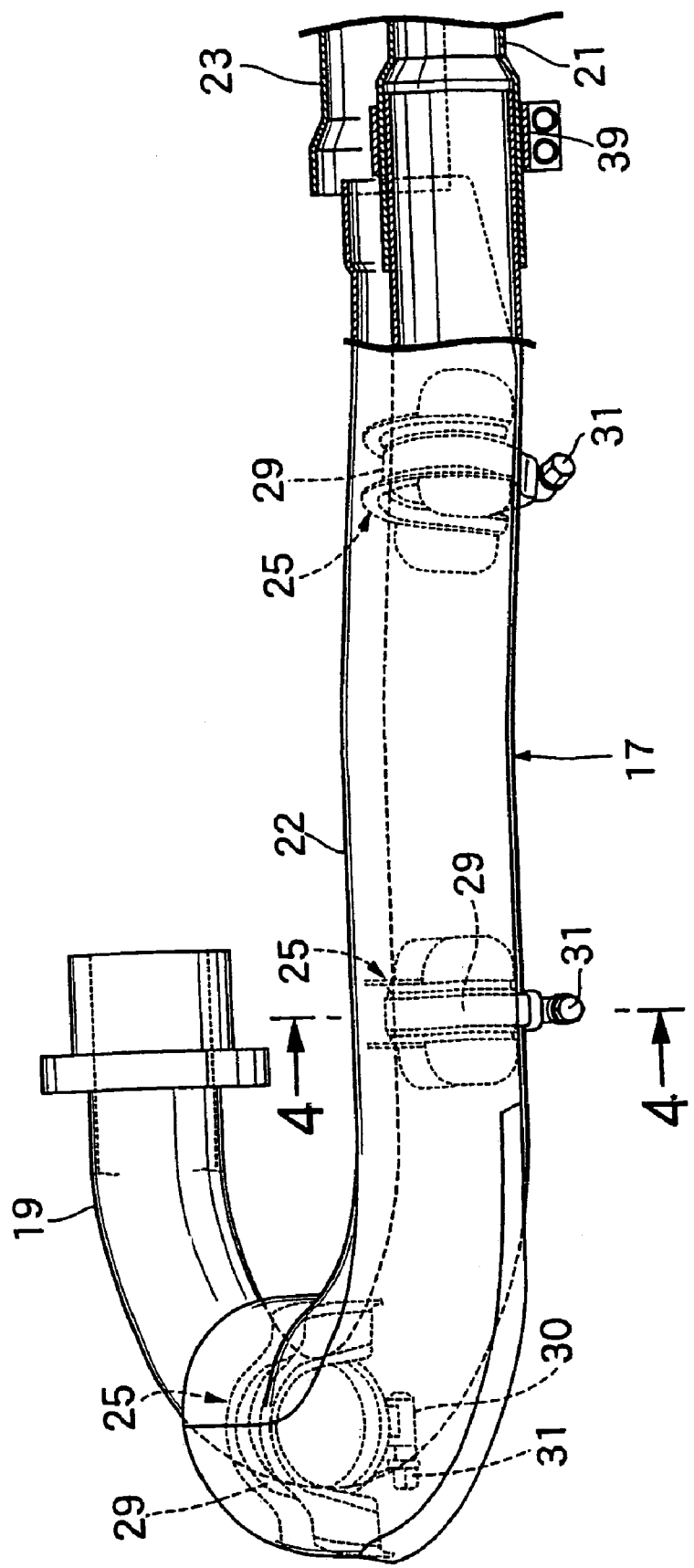
FIG. 3 is a partially cutaway side view of a front exhaust pipe.
Figure 4:
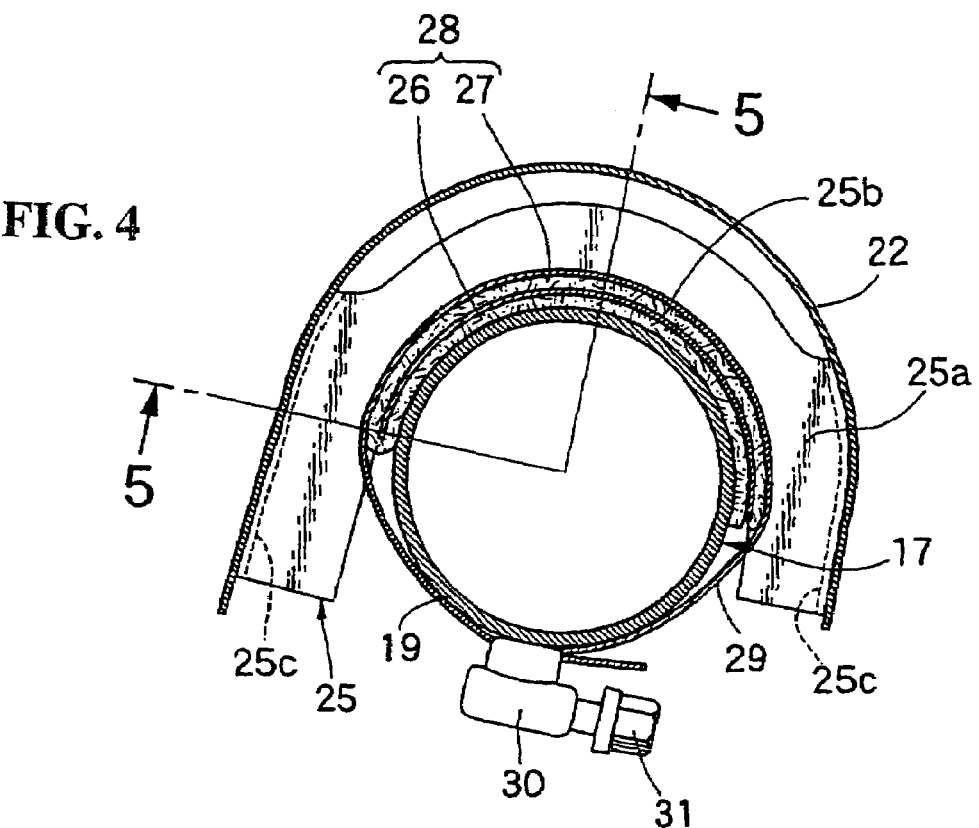
FIG. 4 is a cross section taken along the line 4-4 in FIG. 3.
Figure 5:
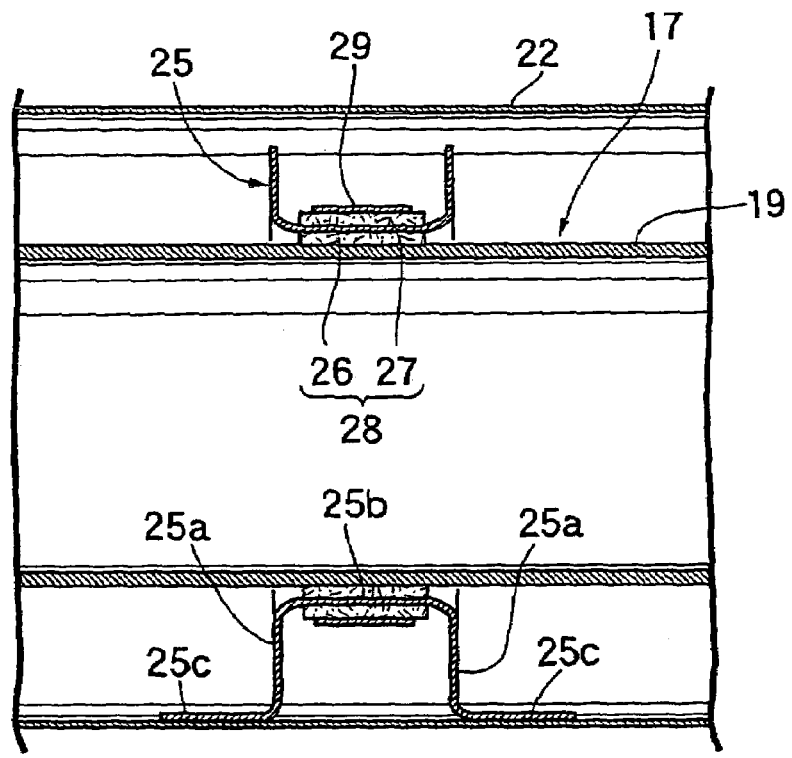
FIG. 5 is a cross section taken along the line 5-5 in FIG. 4.

Referring to FIGS. 3 to 5, the heat insulating cover for covering at least a portion of the exhaust pipe 17 near the engine E, e.g., the heat insulating cover 22 for covering the front exhaust pipe 19 as in this preferred embodiment is formed so as to have a substantially C-shaped cross section for covering a substantially upper half portion of the front exhaust pipe 19. Three stays 25 are fixed by welding to the heat insulating cover 22 so as to be spaced in the longitudinal direction of the front exhaust pipe 19.

Each stay 25 has a pair of side plate portions 25a opposed to each other along a plane orthogonal to the axis of the front exhaust pipe 19, a supporting plate portion 25b connecting the inner ends of the side plate portions 25a so as to be curved to partially surround the outer circumference of the front exhaust pipe 19, and a pair of mounting plate portions 25c connected to the outer ends of the side plate portions 25a so as to make contact with the inner surface of the heat insulating cover 22. These portions 25a, 25b, and 25c are integral with each other. The mounting plate portions 25c are welded to the inner surface of the heat insulating cover 22.

A vibration isolating member 26 is sandwiched between the outer circumference of the front exhaust pipe 19 and the supporting plate portion 25b of each stay 25, and a vibration isolating member 27 is sandwiched between the supporting plate portion 25b of each stay 25 and a band member 29. By tightening the band member 29, the supporting plate portion 25b of each stay 25 is mounted through the vibration isolating members 26 and 27 to the front exhaust pipe 19.

One end of the band member 29 is fixed in a case 30, and the other end portion of the band member 29 has a plurality of slits (not shown) spaced in the longitudinal direction of the band member 29 and is movably inserted through the case 30. A bolt 31 is rotatably supported to the case 30 so as to mesh with the slits of the band member 29. By rotating the bolt 31, the band member 29 can be tightened or loosened. Accordingly, the supporting plate portion 25b of each stay 25 is mounted to the front exhaust pipe 19 by rotating the bolt 31 to thereby tighten the band member 29 in the condition where the vibration isolating member 26 is sandwiched between the outer circumference of the front exhaust pipe 19 and the supporting plate portion 25b and the vibration isolating member 27 is sandwiched between the supporting plate portion 25b and the band member 29.

The vibration isolating members 26 and 27 are respectively sandwiched between the outer circumference of the front exhaust pipe 19 and the supporting plate portion 25b and between the supporting plate portion 25b and the band member 29 and are formed by bending a single vibration isolating sheet 28.

Figure 6:
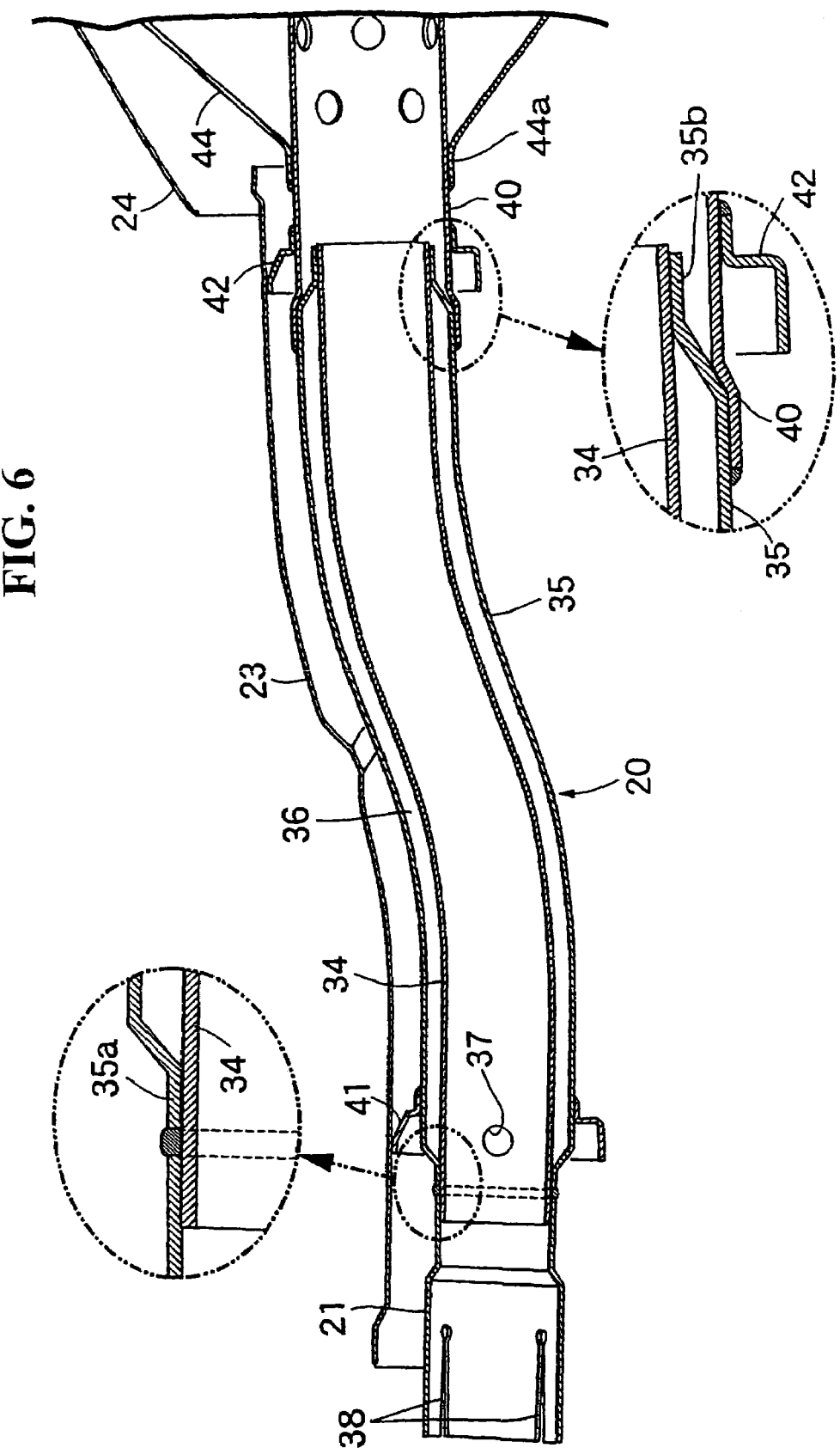
FIG. 6 is a longitudinal sectional view of a rear exhaust pipe.

Referring next to FIG. 6, the rear exhaust pipe 20 is formed as at least a part of the exhaust pipe 17 and has a double pipe structure composed of an inner pipe 34 and an outer pipe 35 surrounding the inner pipe 34. An annular resonance chamber 36 is defined between the inner pipe 34 and the outer pipe 35. The inner pipe 34 is formed with a resonator hole 37 communicating with the annular resonance chamber 36.

The inner pipe 34 is engaged at its one end or upstream end with the downstream end portion of the connection pipe 21. The outer pipe 35 is formed at its one end with an upstream small-diameter portion 35a that is reduced in diameter so as to engage the outer circumference of the inner pipe 34 at its upstream end. The downstream end of the connection pipe 21 and the upstream small-diameter portion 35a of the outer pipe 35 are spaced from each other in the axial direction of the inner pipe 34 so as to form an annular groove. Build-up welding is applied so as to fully fill this annular groove, thereby simultaneously fixing the upstream end of the inner pipe 34, the downstream end of the connection pipe 21, and the upstream small-diameter portion 35 a of the outer pipe 35.

The upstream end portion of the connection pipe 21 is enlarged in diameter so as to engage the downstream end portion of the front exhaust pipe 19. The upstream end portion of the connection pipe 21 is formed with a plurality of axially extending slits 38. In the condition where the downstream end portion of the front exhaust pipe 19 is engaged in the upstream end portion of the connection pipe 21, a band member 39 is tightened so as to reduce the diameter of the upstream end portion of the connection pipe 21, thus connecting the downstream end of the front exhaust pipe 19 through the connection pipe 21 to the upstream end of the inner pipe 34 in the rear exhaust pipe 20.

The outer pipe 35 is formed at its other end or downstream end with a downstream small-diameter portion 35b for slidably engaging the other end or downstream end of the inner pipe 34. Accordingly, one end of the inner pipe 34 is fixed to the outer pipe 35, and the other end of the inner pipe 34 is slidably engaged with the outer pipe 35.

As mentioned above, the inner pipe 34 has the resonator hole 37 communicating with the annular resonance chamber 36 defined between the inner pipe 34 and the outer pipe 35. This resonator hole 37 is formed at one end portion of the inner pipe 34 near the engine E, e.g., at the upstream end portion of the inner pipe 34 as in this preferred embodiment.

The exhaust muffler 18 has an inlet pipe 40. The downstream end of the outer pipe 35 is engaged in the inlet pipe 40 at its upstream end and is fixed to the inlet pipe 40 by welding.

The heat insulating cover 23 is formed so as to cover an upper half portion of the rear exhaust pipe 20. A stay 41 is fixed to the outer circumference of the outer pipe 35 at the upstream end portion of the rear exhaust pipe 20, and a stay 42 is fixed to the outer circumference of the inlet pipe 40 at the upstream end portion of the exhaust pipe 18. The heat insulating cover 23 is welded to these stays 41 and 42.

Referring to FIG. 7, the exhaust muffler 18 includes an outer cylinder 43, an upstream end cap 44 for closing the upstream end of the outer cylinder 43, a downstream end cap 45 for closing the downstream end of the outer cylinder 43, and a continuous inner cylinder 46 set in the outer cylinder 43 so as to define an annular closed chamber 47 between the inner cylinder 46 and the outer cylinder 43. While this annular closed chamber 47 is vacant in this preferred embodiment, it may be filled with a sound insulating material.

The upstream end cap 44 is a conical integral member having a small-diameter connecting a cylindrical portion 44a at the upstream end and a large-diameter engaging cylindrical portion 44b at the downstream end. The inlet pipe 40 is inserted through the small-diameter connecting cylindrical portion 44a, and an intermediate portion of the inlet pipe 40 is welded to the small-diameter connecting cylindrical portion 44a. The large-diameter engaging cylindrical portion 44b is engaged in the upstream end portion of the outer cylinder 43 and welded thereto.

The downstream end cap 45 is an integral member having an engaging cylindrical portion 45a engaged in the downstream end portion of the outer cylinder 43 and an end plate portion 45b for closing the outer end of the engaging cylindrical portion 45a. The downstream end of the outer cylinder 43, the downstream end of the inner cylinder 46, and the engaging cylindrical portion 45a of the downstream end cap 45 are overlaid and welded together. More specifically, a downstream large-diameter portion 46a is formed at the downstream end of the inner cylinder 46 so as to fit on the outer circumference of the engaging cylindrical portion 45a of the downstream end cap 45. A part of the downstream large-diameter portion 46a slightly projects from the downstream end of the outer cylinder 43. In this condition, the downstream large-diameter portion 46a is engaged in the downstream end of the outer cylinder 43. Thus, the downstream end of the outer cylinder 43, the downstream end 46a of the inner cylinder 46, and the engaging cylindrical portion 45a of the downstream end cap 45 are overlaid and welded together.

An upstream large-diameter portion 46b is formed at the upstream end of the inner cylinder 46 so as to make contact with the inner surface of the outer cylinder 43 at its upstream end portion. A tapering portion 46c is formed at any one of the opposite ends of the inner cylinder 46, e.g., at the upstream end of the inner cylinder 46 as in this preferred embodiment so as to be tapered forwardly from the upstream large-diameter portion 46b. Further, an intermediate large-diameter portion 46d is formed at an intermediate portion of the inner cylinder 46 so as to make contact with the inner surface of the outer cylinder 43 at its intermediate portion.

A front partition wall 53 and a rear partition wall 54 are fixed to the inner surface of the inner cylinder 46 so as to be spaced in the axial direction of the inner cylinder 46. A front compartment 50 is defined between the upstream end cap 44 and the front partition wall 53 in the exhaust muffler 18. An intermediate compartment 51 is defined between the front partition wall 53 and the rear partition wall 54 in the inner cylinder 46. A rear compartment 52 is defined between the rear partition wall 54 and the downstream end cap 45 in the exhaust muffler 18.

The downstream end portion of the inlet pipe 40, whose intermediate portion is fixed to the upstream end cap 44, is fixed to the front partition wall 53. The inlet pipe 40 is formed with a plurality of communication holes 55 communicating with the front compartment 50. Further, a diffuser 56 is coaxially connected at its upstream end to the downstream end portion of the inlet pipe 40. The diffuser 56 is a cylindrical member having numerous small holes and a downstream end opening to the intermediate compartment 51. Further, a first communication pipe 57 for connecting the intermediate compartment 51 and the front compartment 50 is fixed to the front partition wall 53 so as to extend therethrough, and a second communication pipe 58 for connecting the front compartment 50 and the rear compartment 52 is fixed to the front and rear partition walls 53 and 54 so as to extend therethrough.

A part of the exhaust gas that has entered the inlet pipe 40 is passed through the communication holes 55 into the front compartment 50, and the remaining exhaust gas is passed through the diffuser 56, the intermediate compartment 51, and the first communication pipe 57 into the front compartment 50. All the exhaust gas that has entered the front compartment 50 is passed through the second communication pipe 58 into the rear compartment 52.

A spark arrester 59 is mounted on the end plate portion 45b of the downstream end cap 45 at a substantially central portion thereof so as to project into the rear compartment 52. The exhaust gas that has entered the rear compartment 52 is discharged through the spark arrester 59 to the outside of the vehicle.

A bracket 60 is fixed to the outer cylinder 43 of the exhaust muffler 18 at an upper portion thereof. This bracket 60 is supported on the body frame F. The heat insulating cover 24 is fixed to the outer cylinder 43 so as to cover the exhaust muffler 18 except the bracket 60.

The operation of this preferred embodiment will now be described. The three stays 25, each having the supporting plate portion 25b curved so as to partially surround the outer circumference of the front exhaust pipe 19, are fixed to the heat insulating cover for covering at least a portion of the exhaust pipe 17 near the engine E, the upstream end of which is connected to the cylinder head 16 of the engine E, e.g., the heat insulating cover 22 for covering the front exhaust pipe 19 as in an embodiment of the invention. The supporting plate portion 25b of each stay 25 is mounted to the front exhaust pipe 19 by tightening the band member 29 in the condition where the vibration isolating member 26 is sandwiched between the outer circumference of the front exhaust pipe 19 and the supporting plate portion 25b and the vibration isolating member 27 is sandwiched between the supporting plate portion 25b and the band member 29.

Accordingly, vibrations from the front exhaust pipe 19 to the heat insulating cover 22 can be reduced wherein the front exhaust pipe 19 is a part of the exhaust pipe 17 to which vibrations from the engine E is easily transmitted, so that the generation of noise due to vibrations of the heat insulating cover 22 can be suppressed. Moreover, since the heat insulating cover 22 is spaced from the front exhaust pipe 19, a higher heat insulating effect can be obtained.

The vibration isolating members 26 and 27, respectively sandwiched between the outer circumference of the front exhaust pipe 19 and the supporting plate portion 25b and between the supporting plate portion 25b and the band member 29, are formed by bending the single vibration isolating sheet 28. Accordingly, the vibration isolating members 26 and 27 can be easily managed with the separation thereof being prevented, and the number of parts can be reduced.

The rear exhaust pipe 20 forms at least a part of the exhaust pipe 17 and has a double pipe structure composed of the inner pipe 34 and the outer pipe 35 surrounding the inner pipe 34. In addition, the inner pipe 34 has the resonator hole 37 communicating with the annular resonance chamber 36 defined between the inner pipe 34 and the outer pipe 35. Accordingly, a resonator having an excellent silencing effect can be configured in the exhaust pipe 17 without an increase in the size of the exhaust muffler 18. Furthermore, since at least a part of the exhaust pipe 17 has a double pipe structure, the surface temperature of the exhaust pipe 17 can be reduced to thereby increase the flexibility of layout of the exhaust device.

The resonator hole 37 is formed at one end portion of the inner pipe 34 near the engine E. Accordingly, a higher silencing effect can be obtained by a resonator effect.

The upstream end of the inner pipe 34 as one end thereof is fixed to the outer pipe 35, and the downstream end of the inner pipe 34 as the other end thereof is slidably fitted with the outer pipe 35. Accordingly, the inner pipe 34 of the rear exhaust pipe 20 having a double pipe structure can slide according to thermal expansion. Further, the downstream end of the outer pipe 35 is engaged and fixed to the inlet pipe 40 of the exhaust muffler 18. Accordingly, the inner pipe 34 can be extended toward the exhaust muffler 18 having a sufficient space.

The exhaust muffler 18 includes the outer cylinder 43, the pair of end caps 44 and 45 for closing the opposite ends of the outer cylinder 43, and the continuous inner cylinder 46 set in the outer cylinder 43 so as to define the annular closed chamber 47 between the inner cylinder 46 and the outer cylinder 43. Accordingly, a cost reduction can be expected by using the continuous inner cylinder 46. Further, the transmission of vibrations of the inner cylinder 46 due to fluctuations in exhaust pressure to the outer cylinder 43 can be blocked by the annular closed chamber 47, thereby obtaining an effect of preventing the generation of noise from the outer cylinder 43.

The downstream end of the outer cylinder 43, the downstream end cap 45, and the downstream end of the inner cylinder 46 are overlaid and welded together.

Accordingly, a cost reduction can be expected by reducing the number of welding positions. Further, the relative positional accuracy between the outer cylinder 43 and the inner cylinder 46 can be easily increased to make the exhaust muffler 18 exhibit a sufficient silencing function.

The large-diameter portion 46b for making contact with the inner surface of the outer cylinder 43 at its upstream end portion is formed at the upstream end of the inner cylinder 46. Accordingly, in configuring a structure for defining the annular closed chamber 47 between the inner cylinder 46 and the outer cylinder 43, an increase in the number of parts can be avoided and a dimensional accuracy can be improved. In addition, a difference in the thermal expansion between the outer cylinder 43 and the inner cylinder 46 can be absorbed by sliding of the upstream end of the inner cylinder 46.

Similarly, the large-diameter portion 46*d* for making contact with the inner surface of the outer cylinder 43 at its intermediate portion is formed at the intermediate portion of the inner cylinder 46. Accordingly, the intermediate portion of the inner cylinder 46 can also be supported to the outer cylinder 43 with a reduced number of parts and an improved dimensional accuracy, so that the mounting stiffness of the inner cylinder 46 can be improved.

Further, the tapering portion 46*c* is formed at any one of the opposite ends of the inner cylinder 46, e.g., at the upstream end of the inner cylinder 46 as in this preferred embodiment so as to taper outwardly of the inner cylinder 46. Accordingly, insertion of the inner cylinder 46 into the outer cylinder 43 can be facilitated to thereby improve the assemble of the unit.

Having thus described an embodiment of the present invention, it should be noted that the present invention is not limited to the above embodiment, but various design changes may be made without departing from the scope of the present invention as defined in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust device for an engine adapted to be mounted on a vehicle, said exhaust device having an exhaust pipe connected at its upstream end to a cylinder head of said engine and an exhaust muffler connected to the downstream end of said exhaust pipe, said exhaust device comprising:
   a heat insulating cover for covering at least a portion of said exhaust pipe near said engine;
   a stay fixed to an inner surface of said heat insulating cover, said stay having a supporting plate portion curved so as to partially surround an outer circumference of said exhaust pipe, a pair of side plate portions disposed, respectively, on upstream and downstream sides on the supporting plate portion, the side plates being parallel to each other and extending along planes that are orthogonal to the axis of the front exhaust pipe, and a pair of mounting plate portions connected, respectively, to upstream and downstream outer ends of the side plate portions so as to make contact with the inner surface of the heat insulating cover;
   a first vibration isolating member sandwiched between the outer circumference of said exhaust pipe and said supporting plate portion;
   a band member adapted to be tightened to mount said supporting plate portion to said exhaust pipe; and
   a second vibration isolating member sandwiched between said supporting plate portion and said band member.

2. The exhaust device according to claim 1, wherein said first vibration isolating member and said second vibration isolating member are formed by bending a single vibration isolating sheet.

3. The exhaust device according to claim 1, wherein at least a part of said exhaust pipe has a double pipe structure including an inner pipe and an outer pipe surrounding said inner pipe, an annular resonance chamber being defined between said inner pipe and said outer pipe, said inner pipe being formed with a resonator hole communicating with said annular resonance chamber.

4. The exhaust device according to claim 2, wherein at least a part of said exhaust pipe has a double pipe structure including an inner pipe and an outer pipe surrounding said inner pipe, an annular resonance chamber being defined between said inner pipe and said outer pipe, said inner pipe being formed with a resonator hole communicating with said annular resonance chamber.

5. The exhaust device according to claim 3, wherein said inner pipe is fixed at one end thereof to said outer pipe and is slidably engaged at the other end with said outer pipe.

6. The exhaust device according to claim 4, wherein said exhaust muffler is provided with an inlet pipe, the downstream end of said outer pipe being fixed to said inlet pipe, one end of said inner pipe near said engine being fixed to the upstream end of said outer pipe.

7. The exhaust device according to claim 3, wherein said resonator hole is formed at one end portion of said inner pipe near said engine.

8. An exhaust device for an engine adapted to be mounted on a vehicle, said exhaust device having an exhaust pipe connected at its upstream end to a cylinder head of said engine and an exhaust muffler connected to the downstream end of said exhaust pipe, wherein:
   said exhaust muffler comprises an outer cylinder, end caps for closing the opposite ends of said outer cylinder, and an inner cylinder set in said outer cylinder so as to define an annular closed chamber between said inner cylinder and said outer cylinder;
   wherein a rear end of said outer cylinder, a forward end of said rear end cap, and a rear end of said inner cylinder are overlaid with respect to each other in an axial direction of the exhaust device and are welded together,
   the rear end of the inner cylinder being sandwiched between the rear end of the outer cylinder and the forward end of said rear end cap.

9. The exhaust device according to claim 8, wherein a large-diameter portion for making contact with the inner surface of said outer cylinder at its other end portion is formed at the other end of said inner cylinder.

10. The exhaust device according to claim 8, wherein an intermediate large-diameter portion for making contact with the inner surface of said outer cylinder at its intermediate portion is formed at an intermediate portion of said inner cylinder.

11. The exhaust device according to claim 9, wherein an intermediate large-diameter portion for making contact with the inner surface of said outer cylinder at its intermediate portion is formed at an intermediate portion of said inner cylinder.

12. The exhaust device according to claim 8, wherein a tapering portion is formed at any one of the opposite ends of said inner cylinder so as to be tapered inwardly toward a longitudinal axis of said inner cylinder.

13. An exhaust device comprising:
   an exhaust pipe adapted to be connected at an upstream end to a cylinder head of an engine and an exhaust muffler connected to a downstream end of the exhaust pipe;
   a heat insulating cover for covering at least a portion of said exhaust pipe;
   a stay fixed to an inner surface of said heat insulating cover, said stay having a supporting plate portion curved so as to partially surround an outer circumference of said exhaust pipe, a pair of side plate portions disposed, respectively, on upstream and downstream sides on the supporting elate portion, the side elates being parallel to each other and extending along planes that are orthogonal to the axis of the front exhaust pipe, and a pair of mounting elate portions connected, respectively, to upstream and downstream outer ends of the side plate portions so as to make contact with the inner surface of the heat insulating cover;

a first vibration isolating member sandwiched between the outer circumference of an exhaust pipe and said supporting plate portion;

a band member adapted to be tightened to mount said supporting plate portion to said exhaust pipe; and a second vibration isolating member sandwiched between said supporting plate portion and said band member.

14. The exhaust device according to claim 13, wherein said first vibration isolating member and said second vibration isolating member are formed by bending a single vibration isolating sheet.

15. The exhaust device according to claim 13, wherein at least a part of said exhaust pipe has a double pipe structure including an inner pipe and an outer pipe surrounding said inner pipe, an annular resonance chamber being defined between said inner pipe and said outer pipe, said inner pipe being formed with a resonator hole communicating with said annular resonance chamber.

16. The exhaust device according to claim 14, wherein at least a part of said exhaust pipe has a double pipe structure including an inner pipe and an outer pipe surrounding said inner pipe, an annular resonance chamber being defined between said inner pipe and said outer pipe, said inner pipe being formed with a resonator hole communicating with said annular resonance chamber.

17. The exhaust device according to claim 15, wherein said inner pipe is fixed at one end thereof to said outer pipe and is slidably engaged at the other end with said outer pipe.

18. The exhaust device according to claim 16, wherein said exhaust muffler is provided with an inlet pipe, the downstream end of said outer pipe being fixed to said inlet pipe, one end of said inner pipe near an engine being fixed to the upstream end of said outer pipe.

19. The exhaust device according to claim 15, wherein said resonator hole is formed at one end portion of said inner pipe near said engine.

20. The exhaust device according to claim 13, wherein said band member is tightened to the exhaust pipe by a bolt being in engagement with slits in said band member to permit the band member to be tightened relative to the exhaust pipe.

21. The exhaust device according to claim 8, further comprising a spark arrester mounted on an end plate portion of the one of said end caps, wherein the spark arrester has a longitudinal axis arranged at an angle to a longitudinal axis of the exhaust muffler.

wherein the spark arrester is mounted on the end plate portion at a substantially central portion thereof so as to project into a rear compartment of the exhaust muffler.

22. The exhaust device according to claim 8, wherein the inner cylinder has a large-diameter portion for making contact with the inner surface of said outer cylinder at both ends thereof.

23. The exhaust device according to claim 8, further comprising a heat insulating cover fixed to the outer cylinder so as to cover the exhaust muffler and the front and rear end caps.

* * * * *